Dec. 26, 1967    L. G. HEERINGA ET AL    3,360,530
TRICYCLIC ISOCHROMANS AND PROCESSES FOR MAKING SAME
Filed June 20, 1963    8 Sheets-Sheet 1
Fig. 2. EXAMPLE 8.
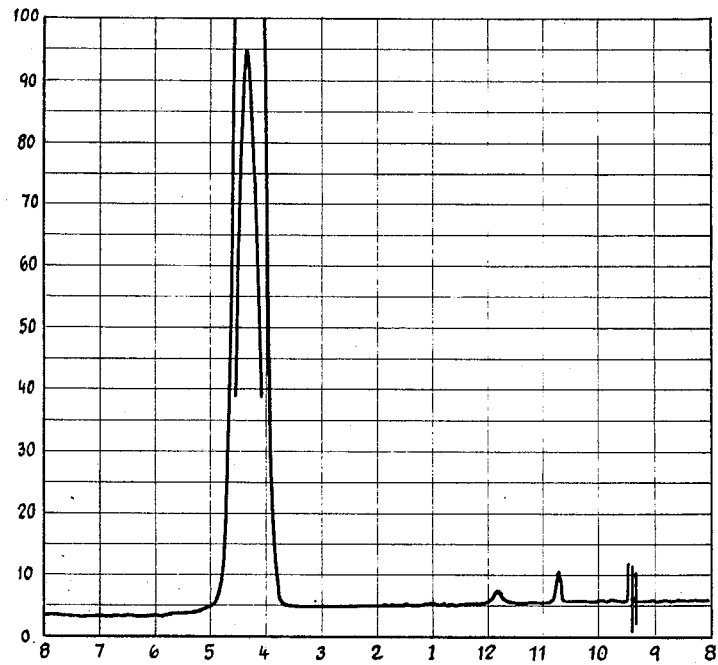
Fig. 1. EXAMPLE 1
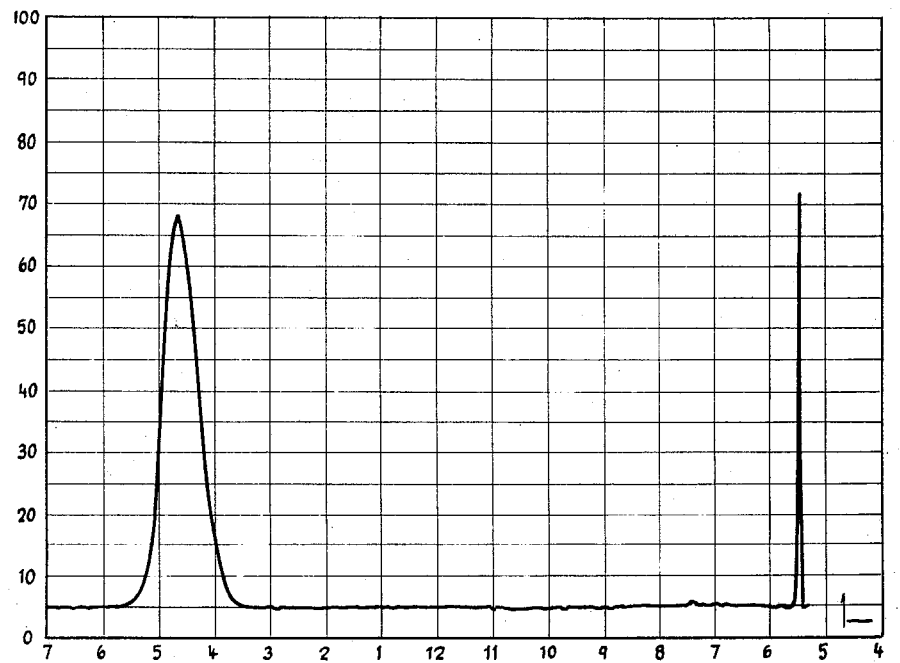

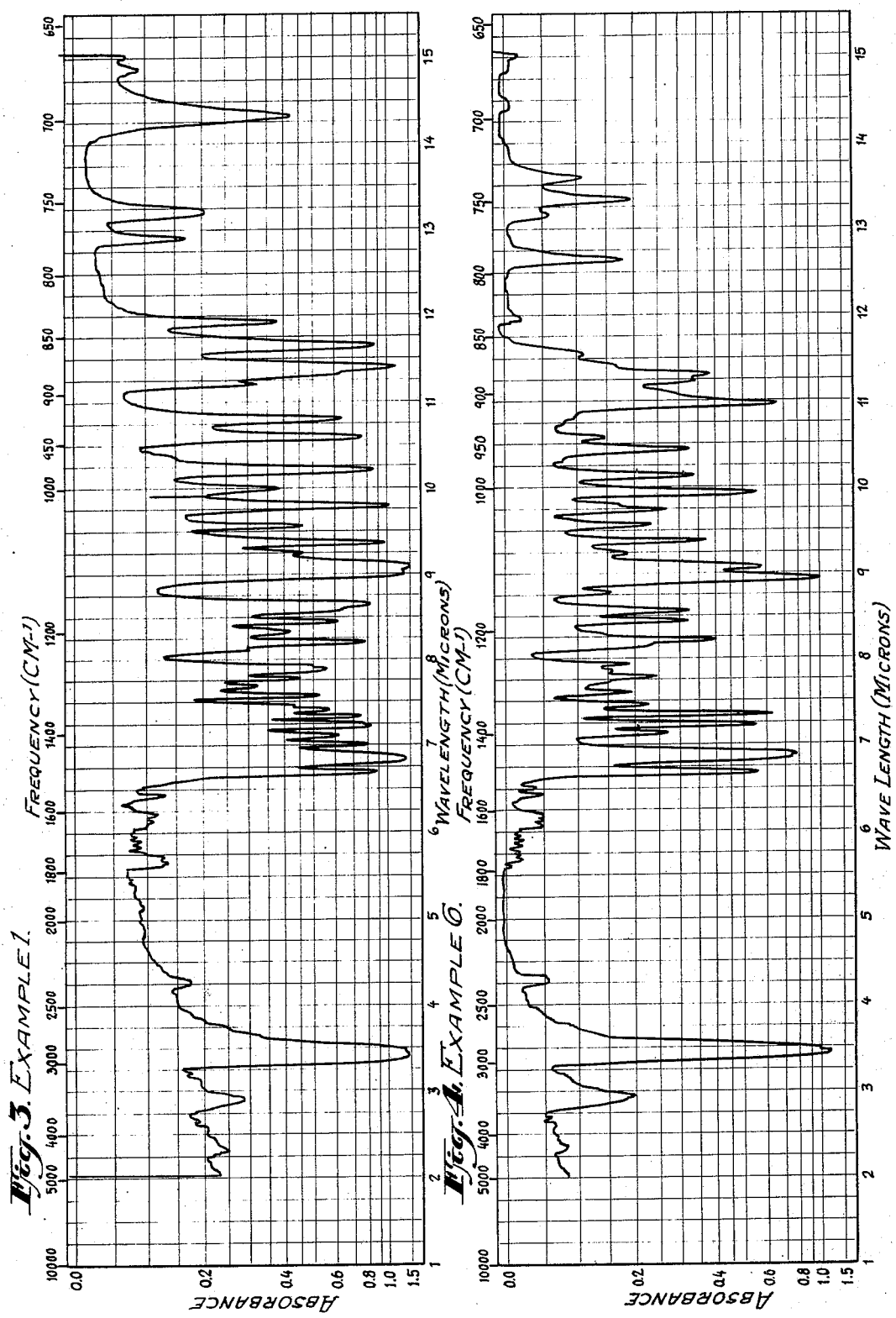

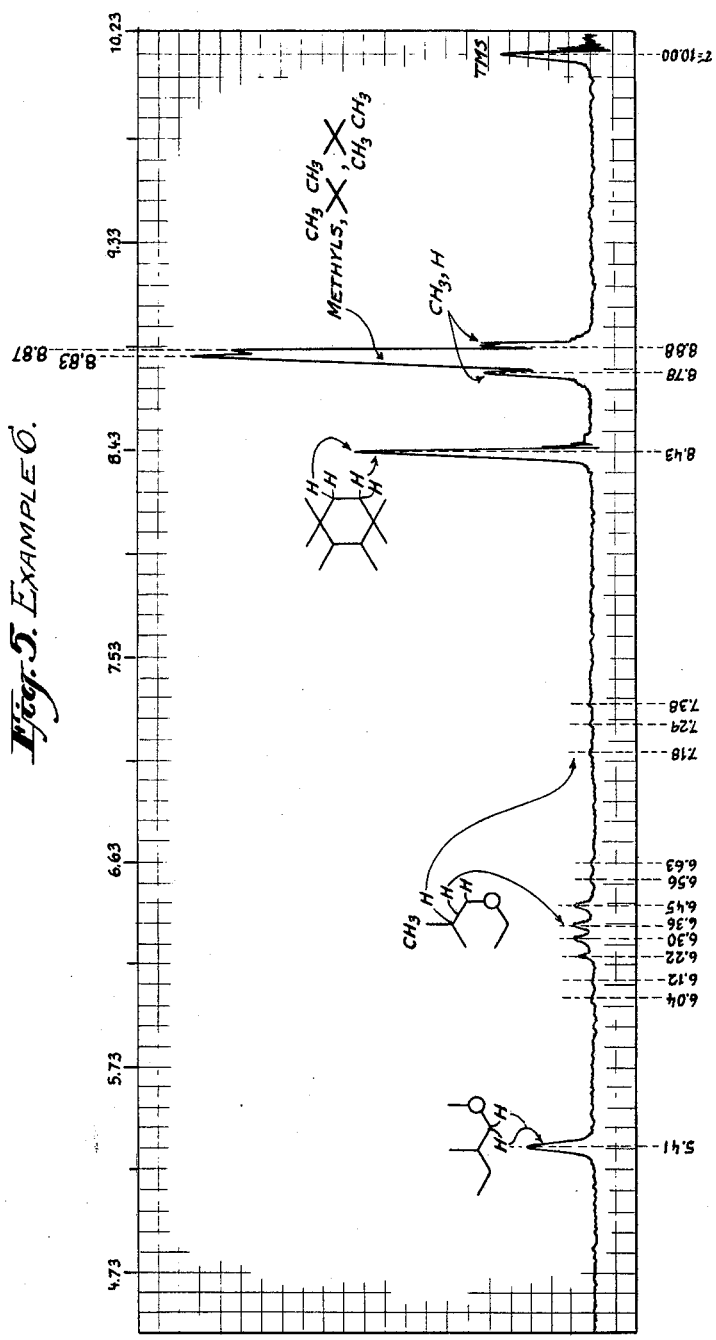

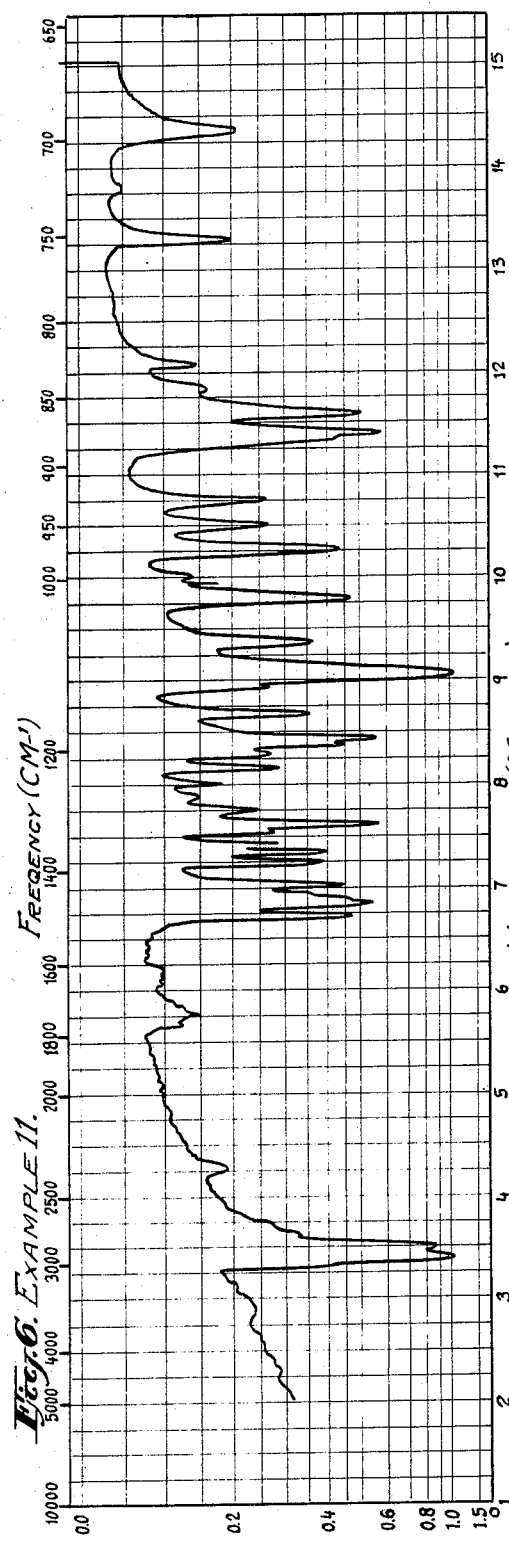
Fig. 6. Example 11.
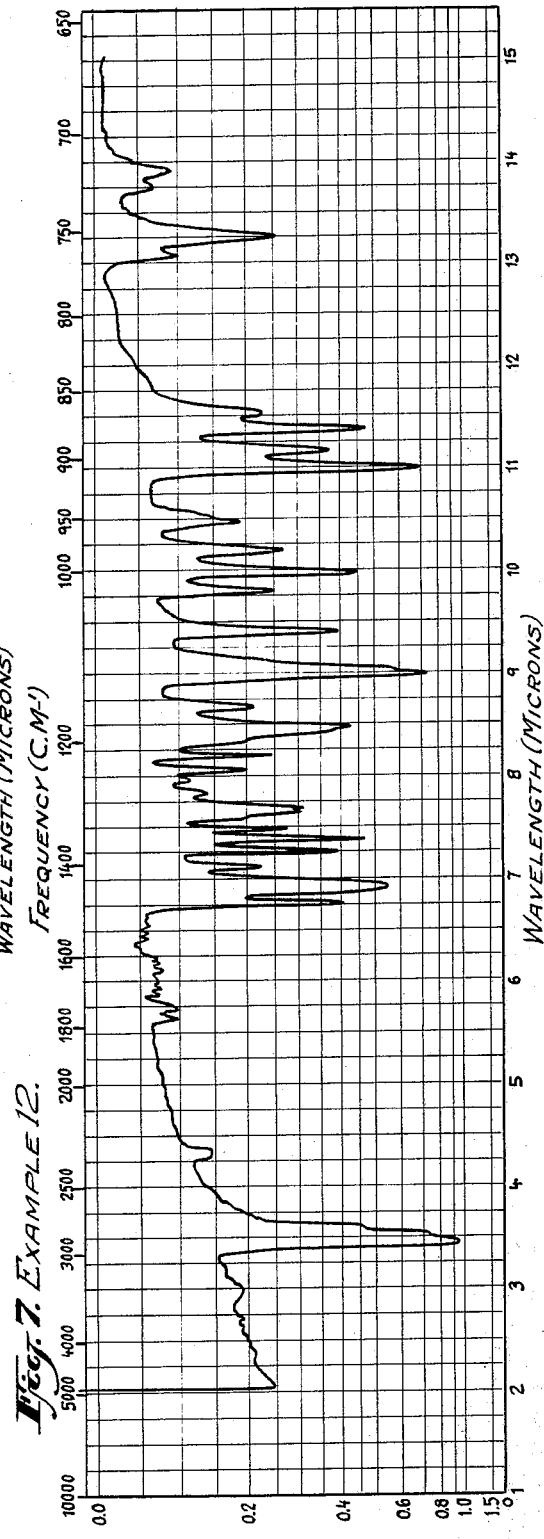
Fig. 7. Example 12.

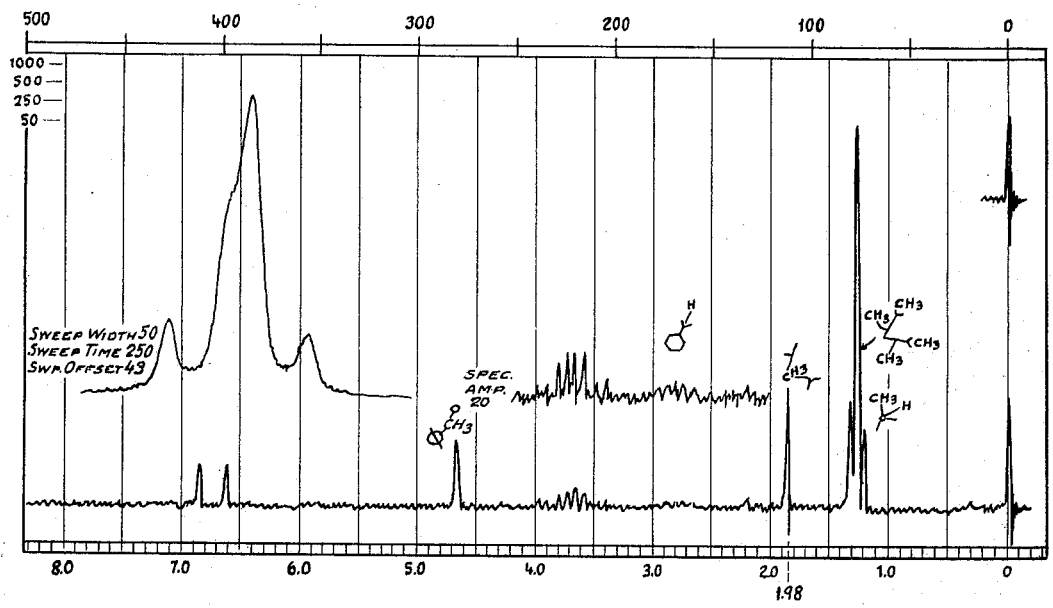
Fig. 8. EXAMPLE 12.
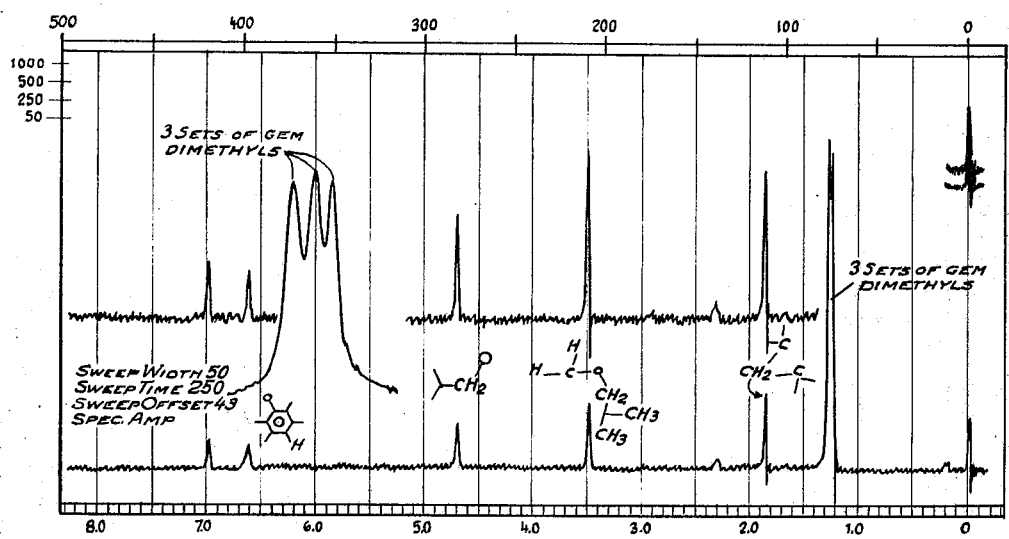
Fig. 9. EXAMPLE 14.

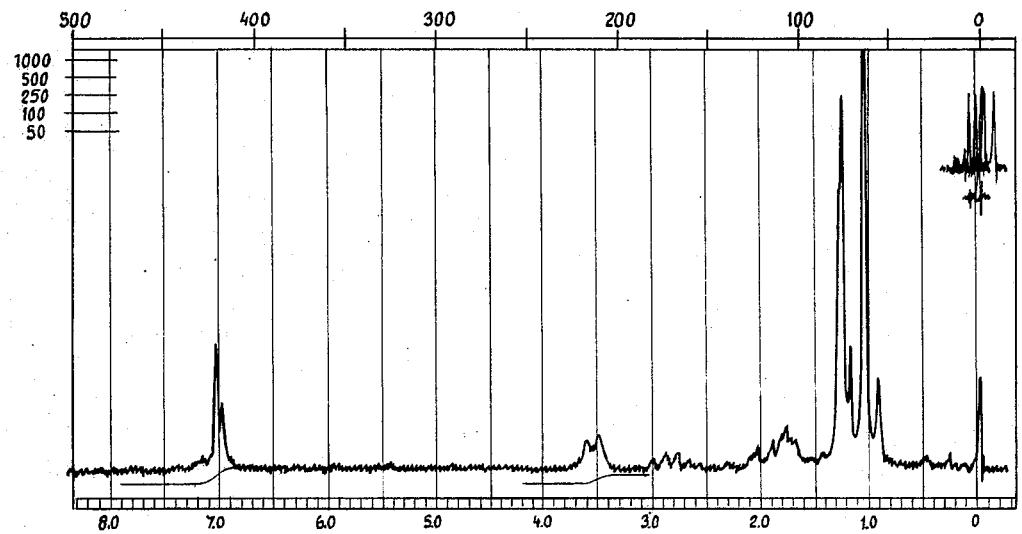
Fig. 10. Example 15.
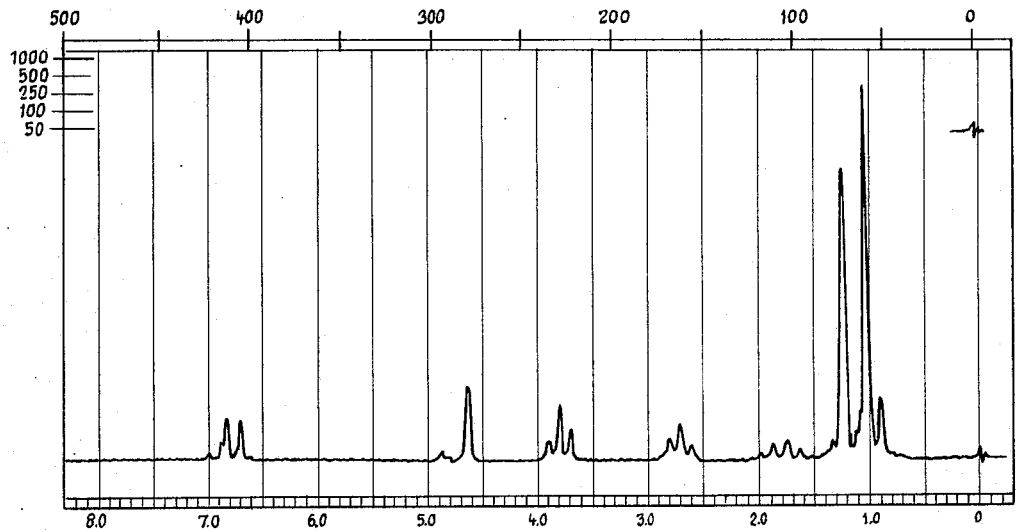
Fig. 15. Example 16.

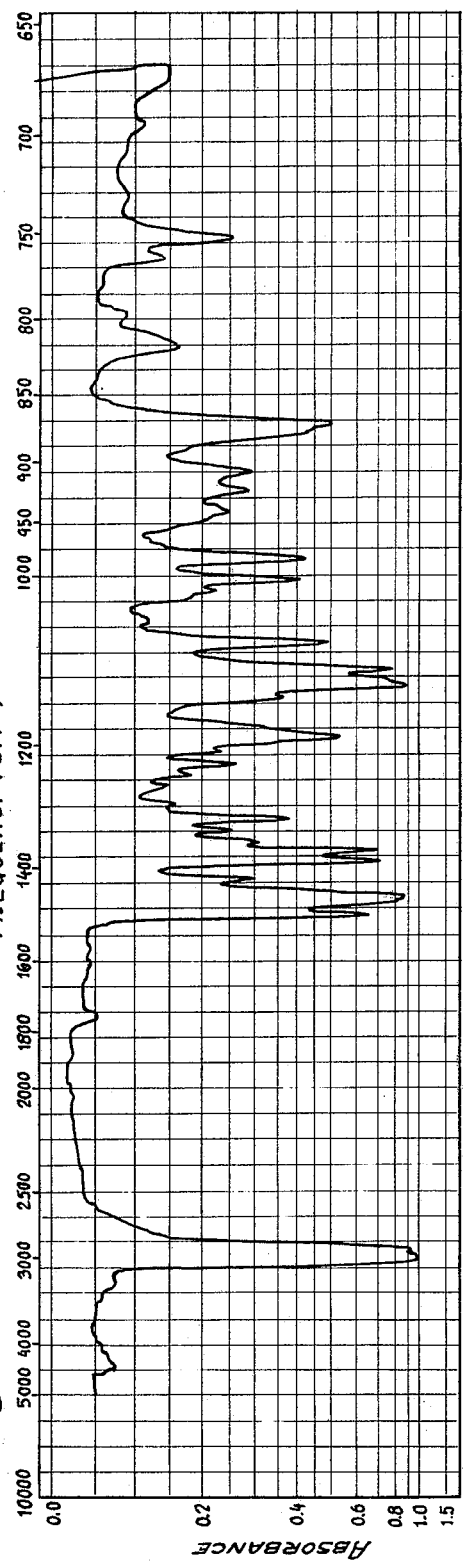
Fig.11. Example 15.
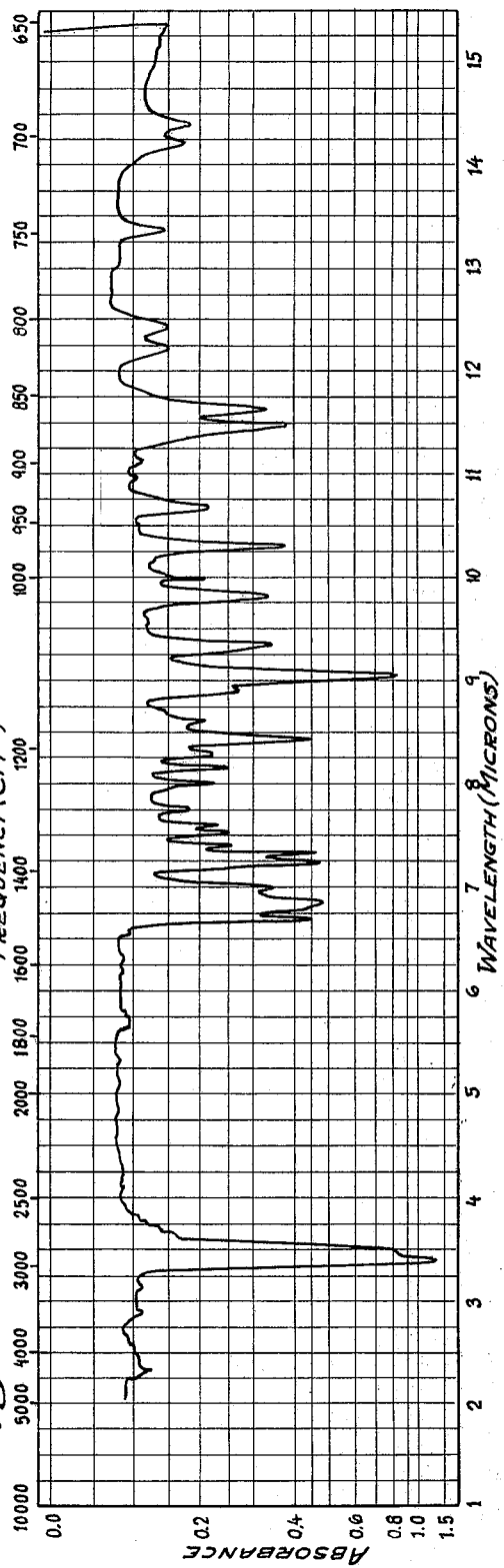
Fig.14. Example 16.

Fig. 12. EXAMPLE 15.
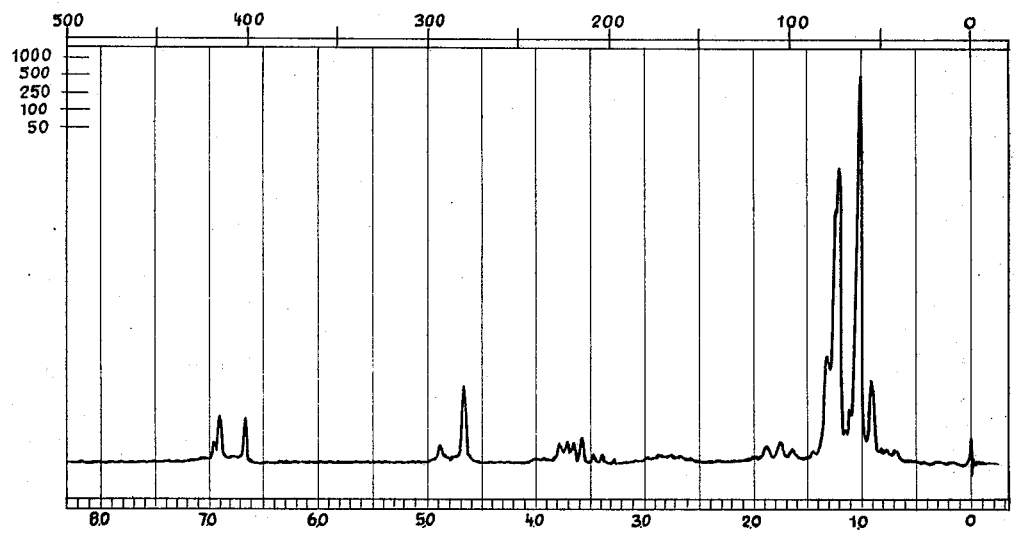
Fig. 13. EXAMPLE 16.
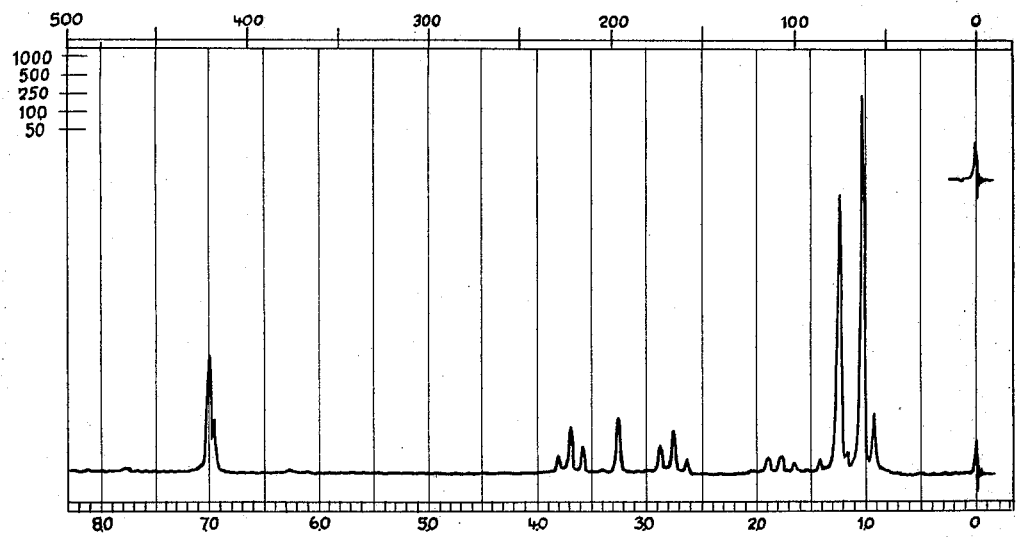

United States Patent Office 3,360,530
Patented Dec. 26, 1967

3,360,530
TRICYCLIC ISOCHROMANS AND PROCESSES FOR MAKING SAME
Lambertus Gerke Heeringa and Muus Gerrit Jan Beets, Hilversum, Netherlands, assignors to International Flavors & Fragrances Inc., New York, N.Y., a corporation of New York
Filed June 20, 1963, Ser. No. 289,261
Claims priority, application Great Britain, July 23, 1962, 28,221/62; Feb. 18, 1963, 6,412/63
5 Claims. (Cl. 260—345.2)

Several classes of compounds with musk odor have been described in the literature, such as macrocyclic lactones and ketones, aromatic nitro compounds, acylated indans, acylated Tetralins, aromatic ketones and aldehydes.

The principal object of the present invention is to provide a new class of organic bodies with musk odor which combine pure and often strong to very strong musk odors with an excellent tenacity, and which show a high stability and do not discolor under conditions in which they, or the compositions of which they are part, are used, for example perfumes, creams, lotions, powders, soaps, detergents, and aerosols.

Another object of the invention is to provide simple, efficient processes for the production of such bodies.

The invention comprises the novel products as well as the novel processes and steps of processes according to which such products are manufactured, the specific embodiments of which are described hereinafter by way of example and in accordance with which we now prefer to practice the invention.

The new compounds with musk odor prepared in accordance with our invention are tricyclic isochromans of the general structure I, in which $R_1$ and $R_2$ are either methyl or hydrogen, in which $R_3$ and $R_4$ either both signify hydrogen or one hydrogen and one methyl group, and in which A means a methylene group (—$CH_2$—), an ethylene group (—$CH_2CH_2$—), an ethylidene group ($CH_3$—HC<), a 1,2-propylene group

[—CH($CH_3$)—$CH_2$—]

or a 2,3-butylene group [—CH($CH_3$)—CH($CH_3$)—].

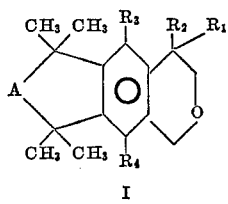

I

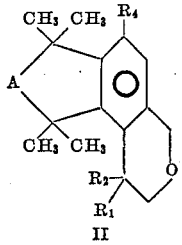

II

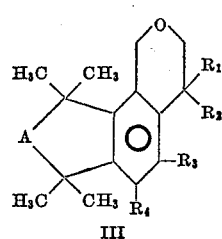

III

In many preparations in which the compounds of type I are obtained as the main products, angular tricyclic isomers of types II and III are obtained in minor quantities.

Some of the strongest musks of this series have the structures IV (2-oxa-4,5,5,8,8-pentamethyl-1,2,3,4,5,6,7,8-octahydroanthracene), V (6-oxa-1,1,2,3,3,8-hexa-methyl-2,3,5,6,7,8-hexahydro-1H-benz(f)-indene), and VI (6-oxa-1,1,2,3,3-pentamethyl-2,3,5,6,7,8-hexahydro-1H-benz(f)-indene). Isochromans of structures VII to XV are also musks of varying strength, some of which have strong and tenacious odors.

The compounds XVI and XVII are very weak musks, probably because of the decreased accessibility to the functional group. Compounds falling under I, II and III:

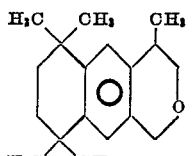
IV

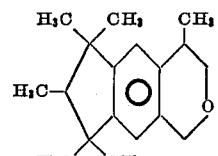
V

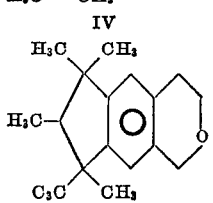
VI

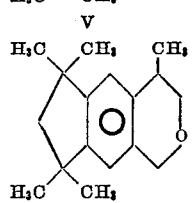
VII

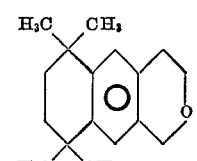
VIII

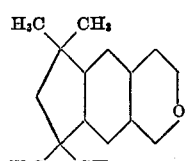
IX

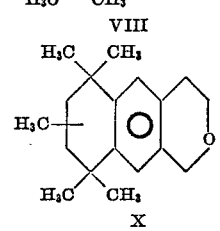
X

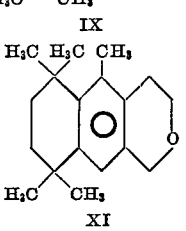
XI

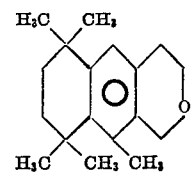
XII

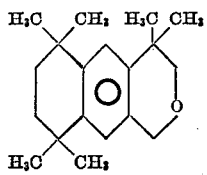
XIII

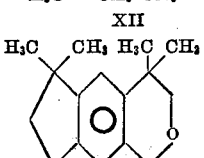
XIV

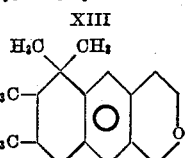
XV

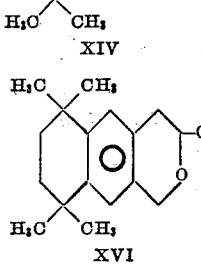
XVI

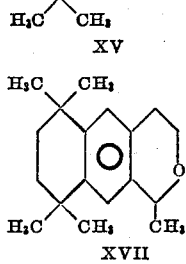
XVII

Compounds of the structural type I can be obtained according to several methods, described below, in which compounds of the structural types II and III are usually obtained as by products.

(1) Isochromans and their mono- and dimethyl homologues of which XVIII to XXII are examples are easily accessible by reaction of the corresponding phenylethyl alcohol homologues with formaldehyde, for example, according to P. Maitte: Ann. Chim. (12), 9, 431 (1954); A. Rieche and E. Schmitz, Chem. Ber. 89, 1254 (1956).

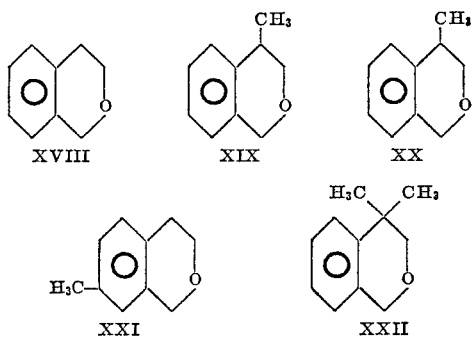

Formula XXII falls under the general structure

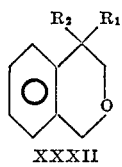

in which R₁ and R₂ are as defined hereinabove.

Generally the phenylethyl alcohols can be synthesized conveniently from the corresponding aromatic hydrocarbon and an alkylene oxide in the presence of a Lewis acid such as aluminum chloride, for example:

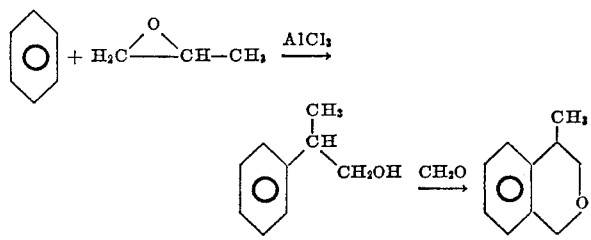

The isochromans obtained in this way can be cyclialkylated preferably by reaction with suitable 1,4-dihalides or 1,3-dihalides under the influence of a suitable alkylation catalyst. Instead of dihalides the corresponding diols, 1,3-, 1,4- or 1,5-dienes can be used.

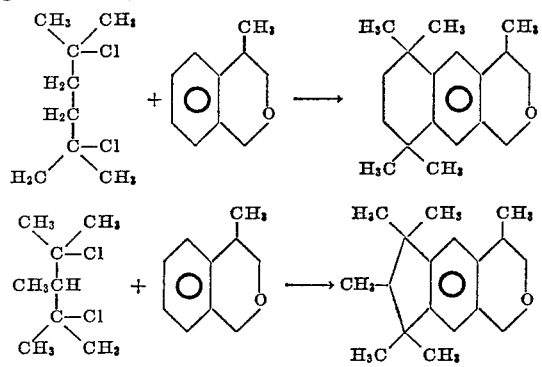

The dihalides have the general structure

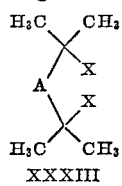

(2) Polymethyl tetralins and polymethyl indans of which XXIII–XXVI are examples, are also possible intermediates for the synthesis of the musks described as follows:

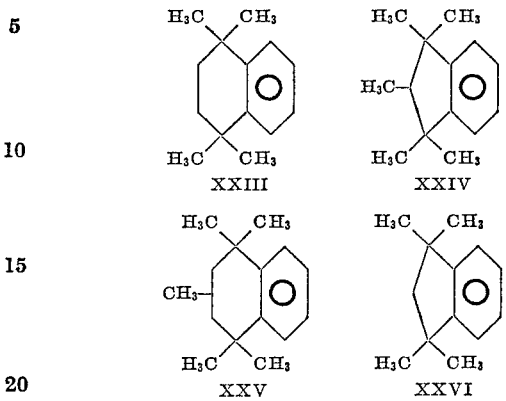

They can be obtained according to many methods, of which the following are mentioned as examples:

(2.1) Cyclialkylation of benzene and toluene with the reagents mentioned under (1) leads to the formation of polymethyl indans or polymethyl Tetralins.

(2.2) A hydrocarbon of structure XXIV can be synthesized by condensation of α-methylstyrene with tertiary amyl alcohol.

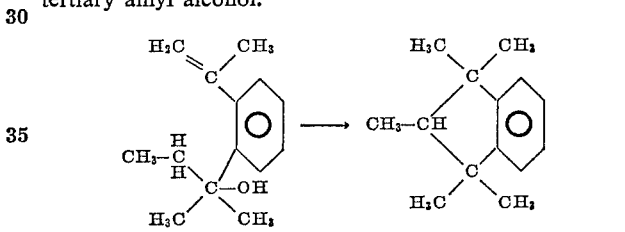

(2.3) A related method in which 2-methylbutene-2 is condensed with α-methylstyrene is known. It is not a perfume.

(2.4) Polymethyl indans can be prepared by Friedel-Crafts condensation of aromatic hydrocarbons with mesityloxide, followed by Grignard reaction and cyclization.

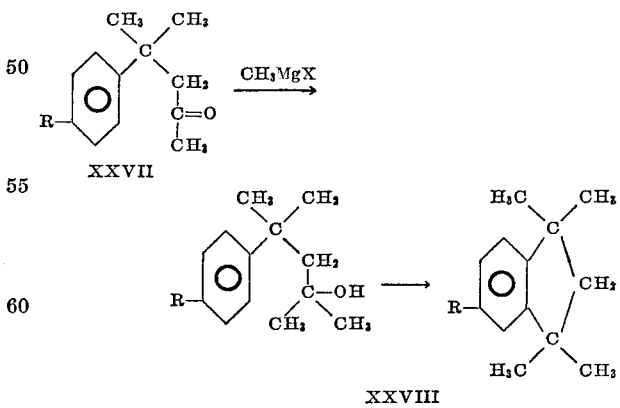

A variant of this method is found in the Kondakov acetylation of 2-methylbutene-2 followed by condensation with benzene and reaction with methyl magnesium bromide and cyclization.

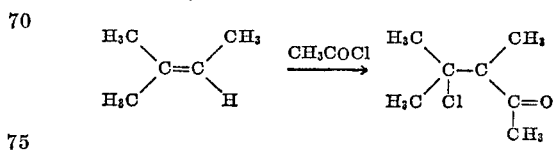

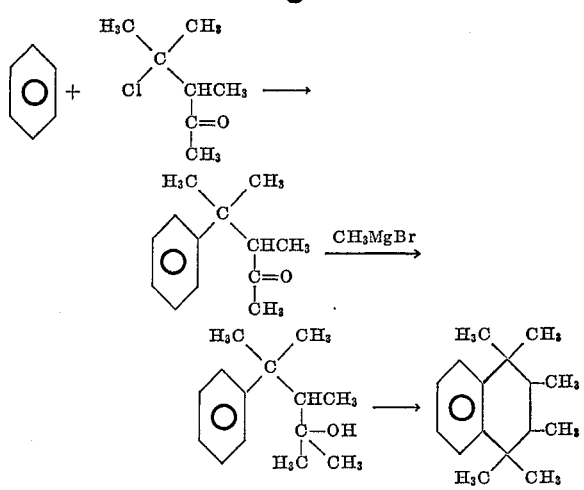

(2.5) For the synthesis of polymethyl Tetralins the intermediate XXVII may be condensed with isopropyl magnesium bromide followed by cyclization, for example:

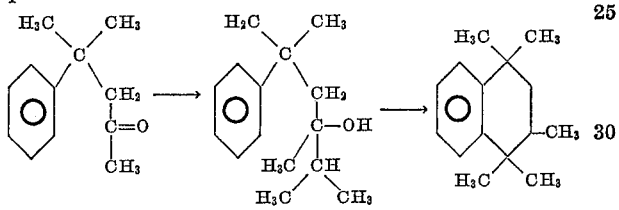

(2.6) An alternative method involves the reduction of XXVII to the corresponding alcohol followed by conversion into the halide. The corresponding Grignard-complex can be condensed with acetone after which cyclization leads to the formation of a Tetralin homologue, for example:

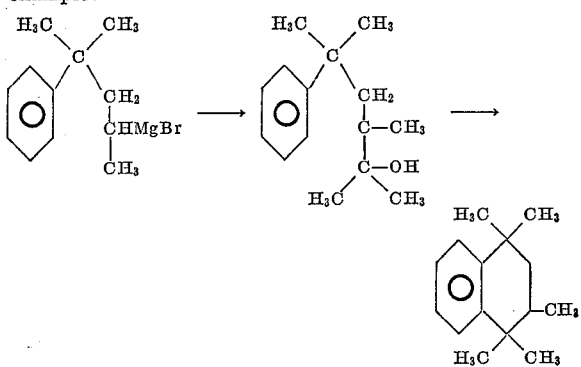

By reaction of the polymethyl Tetralins and polymethyl indans with epoxides and subsequent condensation of the alcohols formed, with formaldehyde, the desired tricyclic isochromans in accordance with our invention are obtained in moderate to good yields, for example:

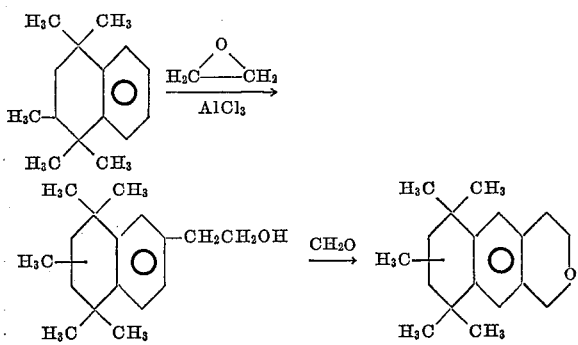

A large number of related materials have been prepared, as indicated below, in order to define the scope of the invention.

(1) The corresponding chroman derivatives are practically odorless, for example XXIX (melting point 74.0° to 74.7° C.).

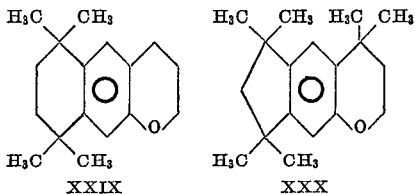

Also XXX (melting point 77.9° to 78.7° C.) is odorless.

(2) Homologues with fewer methyl groups in the alicyclic ring have no musk odor; XXXI (melting point 88.6° to 89.9° C.) is odorless.

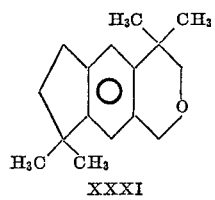

The invention comprises the application of the new tricyclic isochroman derivatives disclosed in perfumes and perfumed articles such as lotions, powders, creams, soaps, detergents and aerosols.

The following examples illustrate the invention but are not intended to limit it, except as indicated in the appended claims.

EXAMPLE 1

*2-oxa-5,5,8,8-tetramethyl-1,2,3,4,5,6,7,8-octahydroanthracene (VIII)*

A suspension of 1000 g. of aluminum chloride in 2 litres of dry $CCl_4$ was cooled to —10° C. In the course of 1½ hours there was added with vigorous stirring a solution of 402 g. of isochroman and 549 g. of 2,5-dichloro-2,5-dimethylhexane in 1250 ml. of dry $CCl_4$.

During the addition, the temperature was maintained at —5° C. to —10° C. by using an ice-salt bath while a vigorous stream of nitrogen was bubbled through the reaction mixture. After an additional stirring period of half an hour at 0° C. the reaction product was poured onto a mixture of 5 kg. ice and 600 ml. of concentrated HCl.

The oil layer was separated and stirred 2 hours at 50° C. with 600 ml. of a 50% alcoholic KOH solution. The solution was then poured into 6 litres of water and the oil layer was separated. The solvent was distilled off and the crude product, 720 g., was distilled at 3 mm. Hg in a nitrogen atmosphere to separate residue, yielding the following fractions:

|  | G. |
|---|---|
| I. B.P. 60° to 123° C. | 180 |
| II. B.P. 130° to 170° C. | 356 |
| III. B.P. 170° to 180° C. and | 17 |
| A residue | 166 |

The crude musk from fractions II and III was purified by crystallization from an equal volume of ethanol, yielding 260.5 g. of virtually pure product, white crystals with a strong musk odor; M.P. 65.5 to 66.2° C., i.e. 35.6% of theory of the title compound. Recrystallization of 10 g. of this material from 10 ml. of ethanol gave 8.5 g. with M.P. 65.5° to 66.3° C.

Column chromatography of the product on $Al_2O_3$ with benzene as eluent, and gas chromatography on a 1.20 m. glass column packed with 30% Reoplex-400, which is a commercially available stationary phase for G.L.P.C., and is a polyester, on Embacel, which is a commercially available support material, essentially $SiO_2$, at 155° C., demonstrated that the product was pure. The gas chromatogram is shown in FIGURE 1 of the accompanying drawings. This was confirmed by CH analysis ($C_{17}H_{24}O$): found C, 83.57, 83.61; H, 9.94, 9.87; calc. C, 83.55; H, 9.90.

The linear structure was confirmed by mass spectrometry, N.M.R. and I.R.

The I.R. spectrum in KBr is given in FIGURE 3 of the accompanying drawings.

EXAMPLE 2

*2-oxa-5,5,8,8-tetramethyl-1,2,3,4,5,6,7,8-octahydroanthracene (VIII)*

According to the same procedure as in Example 1 the cyclialkylation was carried out in 1,2-dichloroethane at 25° to 30° C. under a nitrogen blanket, using a suspension of 305 g. (2.28 moles) of aluminum chloride in 305 ml. of redistilled dichloroethane and a solution of
122 g. (0.91 mole) of isochroman, and
167 g. (0.91 mole) of dichlorodimethylhexane in 320 ml. of redistilled dichloroethane The reaction mixture was worked up as described in Example 1.

Upon flash distillation of the crude product there were obtained 124 g. of distillate, B.P. 120° to 250° C. at 4 mm. Hg, and 67 g. of residue. Fractionation of the distillate through a 12-plate Vigreux column yielded 62.53 g. of a colorless viscous liquid with a strong musk odor, which was shown by gas liquid partition chromatography to contain about 92% of the title compound.

Crystallization from an equal volume of ethanol yielded the nearly pure crystalline musk with M.P. 64.0° to 65.8° C.

EXAMPLE 3

*2-oxa-5,5,8,8-tetramethyl-1,2,3,4,5,6,7,8-octahydroanthracene (VIII)*

By the same procedure as in Example 2, using dichloromethane as a solvent, and starting from a suspension of 333.5 g. (2.5 moles) of aluminum chloride in 334 ml. of redistilled dichloromethane and a solution of
134 g. (1 mole) of isochroman, and
183 g. (1 mole) of dichlorodimethylhexane in 350 ml. of dichloromethane there were obtained after fractionation through a 12-plate Vigreux column: 68.37 g. of a colorless semi-crystalline product with a strong musk odor.

Gas chromatography on Reoplex–400 as mentioned in Example 1 proved the presence of about 92% of the linear isomer mentioned in the title.

EXAMPLE 4

*2-oxa-1,5,5,8,8-pentamethyl-1,2,3,4,5,6,7,8-octahydroanthracene (XVII)*

According to the method described in Example 1 this compound was synthesized by cyclialkylation of 1-methylisochroman (prepared by reacting phenylethyl alcohol with acetaldehyde) using a suspension of 333 g. (2.5 moles) of aluminum chloride in 670 ml. of dry $CCl_4$, to which was added a solution of
148 g. (1.0 mole) of 1-methylisochroman, and
183 g. (1.0 mole) of 2,5-dichloro-2,5-dimethylhexane in 400 ml. of dry $CCl_4$ in the course of 1½ hours at −5° C.

The reaction product was worked up in the manner described in Example 1, and the crude product was distilled in a nitrogen atmosphere in order to separate the residue, giving 127 g. of distillate, B.P. 120° to 215° C./6 mm. Hg and 93 g. of residue.

The distillate was fractionated through a 12-plate Vigreux-type column, and the fractions with B.P. 103° to 108° C. at 0.15 to 0.25 mm. Hg and a refractive index $n_D^{20}$ 1.5364 to 1.5366 were crystallized from twice the volume of ethanol.

There were obtained 40.5 g. of a colorless crystalline product with M.P. 67.1 to 68.7° C.

Recrystallization from ethanol yielded the pure (by gas chromatography) white crystalline product having a very weak musk odor, with M.P. 70.9 to 71.5° C. CH analysis ($C_{18}H_{26}O$): found C, 83.64, 83.69; H, 10.16, 10.20; calculated C, 83.66; H, 10.14.

The structure was confirmed by mass spectrometry, N.M.R. and I.R.

EXAMPLE 5

*2-oxa-3,5,5,8,8-pentamethyl-1,2,3,4,5,6,7,8-octahydroanthracene (XVI)*

3-methylisochroman was prepared from 1-phenylpropanol-2 in a yield of 88%; B.P. 61° C. at 1 mm. Hg; $n_D^{20}$ 1.5281; $d_4^{20}$ 1.0250. A suspension of 333 grams (2.5 moles) of $AlCl_3$ in 670 ml. of $CCl_4$ was cooled to 0° C. At this temperature a solution of 148 g. (1.0 mole) of 3-methylisochroman, and
183 g. (1.0 mole) of 2,5-dichloro-2,5-dimethylhexane in 400 ml. of $CCl_4$ was added with vigorous stirring in the course of 1½ hours while a vigorous stream of nitrogen was bubbled through the reaction mixture.

The mixture was stirred for an additional half hour, while the temperature was allowed to rise to room temperature, and worked up according to Example 1.

Upon flash distillation in a nitrogen atmosphere, in order to separate from residue, there were obtained: 180 g. of distillate, B.P. 120° to 200° C. at 4 mm. Hg, and 59 g. of residue.

The distillate was fractionated through a Vigreux column with 16 theoretical plates and the fractions with a boiling point 111° to 120° C. at 0.2 to 0.3 mm. Hg were crystallized from ethanol, yielding 78 g. of virtually pure product, M.P. 80.0° to 80.5° C. Recrystallization raised the melting point to 81.8 to 82.2° C.; practically odorless white crystals. Gas chromatography on a Reoplex–400 column at 180° C. and CH analysis ($C_{18}H_{26}O$): found C, 83.54, 83.59; H, 10.20, 10.13; calculated C, 83.66; H, 10.14, demonstrated that the product was pure. The structure was confirmed by mass spectrometry, N.M.R. and I.R.

EXAMPLE 6

*2-oxa-4,5,5,8,8-pentamethyl-1,2,3,4,5,6,7,8-octahydroanthracene (IV)*

4-methylisochroman was synthesized from hydratropic alcohol and formaldehyde, according to the procedure given by Rieche and Schmitz, Chem. Ber., 89, 1254 (1956), in a yield of 88%, as a colorless liquid with B.P. 70° C. at 3 mm. Hg; $n_D^{20}$ 1.5361, $d_4^{20}$ 1.0411.

Cyclialkylation of 4-methylisochroman was carried out according to Example 1 in exactly the same way with 444 g. (3.0 moles) of 4-methylisochroman,
549 g. (3.0 moles) of 2,5-dichloro-2,5-dimethylhexane,
1000 g. (7.5 moles) of $AlCl_3$ in dry $CCl_4$ at a temperature of −5° to −10° C. After distilling off the solvent, the crude product, 60 g., was distilled at 3 mm. Hg under nitrogen, yielding 466 g. of distillate, B.P. 130° to 200° C., 173 g. of residue.

Upon fractionation of the distillate through a Vigreux-type column of 8 theoretical plates, at 0.1 mm. Hg under nitrogen, there were obtained 276 g., i.e. 35.7% of theory of 2 - oxa-4,5,5,8,8-pentamethyl-1,2,3,4,5,6,7,8-octahydroanthracene, as a colorless viscous liquid, B.P. 126° to 128° C. at 0.1 mm. Hg and $n_D^{20}$ 1.5378 to 1.5380, which slowly crystallized upon standing. Recrystallization from ethanol afforded the pure compound, white crystals with very strong and tenacious musk odor; M.P. 44.7° to 45.4° C. CH analysis ($C_{18}H_{26}O$): found C, 83.63, 83.74; H, 10.21, 10.16; calc. C, 83.66; H, 10.14. The structure was confirmed by mass spectrometry, N.M.R. and I.R. The I.R. spectrum in KBr is given in FIGURE 4 of the accompanying drawings and the N.M.R. spectrum is given in FIGURE 5.

EXAMPLE 7

*2-oxa-4,5,5,8,8-pentamethyl-1,2,3,4,5,6,7,8-octahydroanthracene (IV)*

A suspension of 1015 g. (7.6 moles) of aluminum chloride in 2500 ml. of dry trans-1,2-dichloroethane was cooled to 0° C., and in the course of 30 minutes there were added in a nitrogen atmosphere under vigorous stirring 592 g. (4.0 moles) of 4-methylisochroman while the temperature was maintained at −5° to 0° C. The mixture was cooled to −10° to −5° C., and in the course of 40 minutes there was added a solution of 696 g. (3.8 moles) of 2,5-dichloro-2,5-dimethylhexane in 1500 ml. of trans-1,2-dichloroethane. The mixture was stirred for an additional 10 minutes at −10° to −5° C., and thereafter poured out into a mixture of 5000 g. of ice and 1500 g. of concentrated HCl. The oil layer was separated and worked up as described in Example 1. Distillation of the crude musk in order to separate from residue afforded 872.5 g. of distillate, B.P. 80° to 220° C. at 5 mm. Hg, and 110.5 g. of residue. Upon fractionation of the distillate through a Vigreux column of 12 theoretical plates at 3 mm. Hg in a nitrogen atmosphere, there were obtained 699 g. of pure 2-oxa-4,5,5,8,8-pentamethyl-1,2,3,4,5,6,7,8-octahydroanthracene with a very strong musk odor as a colorless viscous liquid with B.P. 143° C. at 3 mm. Hg and $n_D^{20}$ 1.5382, which crystallized slowly upon standing to a product which is identical in all respects with the compound described in Example 6.

EXAMPLE 8

*2-oxa-4,4,5,5,8,8-hexamethyl-1,2,3,4,5,6,7,8-octahydroanthracene (XIII)*

4,4-dimethylisochroman was prepared from 2-methyl-2-phenyl-propanol by cyclization with formaldehyde under the influence of HCl, in a yield of 79%. It is a colorless liquid with a musty, camphorlike odor: B.P. 74° C. at 3 mm. Hg, $n_D^{20}$ 1.5278, $d_4^{20}$ 1.0191.

The cyclialkylation of 4,4-dimethylisochroman was carried out as described in Example 4 starting with a suspension of 333 g. (2.5 moles) of aluminum chloride in 800 ml. of dry $CCl_4$ and a solution of 162 g. (1 mole) of 4,4-dimethylisochroman and 183 g. (1 mole) of 2,5-dichloro-2,5-dimethylhexane in 600 ml. of dry $CCl_4$. There were obtained after flash distillation 239 g. of distillate with B.P. 150° to 185° C. at 5 mm. Hg which partly crystallized upon standing. Recrystallization from twice its volume of ethanol afforded the pure compound with M.P. 71.8° to 72.7° C.; white crystals with moderately strong musk odor. CH analysis ($C_{19}H_{28}O$): found C, 83.85, 83.89; H, 10.33, 10.35; calc. C, 83.77; H, 10.36. Gas chromatography on Reoplex-400 at 174° indicated the presence of two very small impurities, each ca. 0.11%. The gas chromatogram is given in FIGURE 2 of the accompanying drawings.

EXAMPLE 9

*2-oxa-5,5,6,(7),8,8-pentamethyl-1,2,3,4,5,6,7,8-octahydroanthracene (X)*

*2-oxa-5,5,6,7,8,8-hexamethyl-1,2,3,4,5,6,7,8-octahydroanthracene (XV)*

A suspension of 43.4 g. (0.325 mole) of aluminum chloride in 140 g. of dried $CCl_4$ was cooled to −10° C. In the course of 1½ hours there was added in a nitrogen atmosphere with vigorous stirring at a temperature of −5° to −10° C. a solution of 25.6 g. (0.13 mole) of 2,5-dichloro-2,3,5-trimethylhexane, and 17.4 g. (0.13 mole) of isochroman in 86.0 g. of dried $CCl_4$ The mixture was stirred for an additional half hour at a temperature of 0° C. and worked up as described in Example 1. The crude product was separated from residue by distillation under nitrogen and there were obtained 16.1 g. of distillate, B.P. 60° to 110° C. at 4 mm. Hg, 14.6 g. of distillate, B.P. 110° to 200° C. at 0.4 to 1.0 mm. Hg, and 4.5 g. of residue Fractionation of the second fraction of the distillate through an 11-plate Vigreux column afforded 4.13 g. of a mixture of 2 - oxa-5,5,6,8,8-pentamethyl-1,2,3,4,5,6,7,8-octahydroanthracene and 2 - oxa-5,5,7,8,8-pentamethyl-1,2,3,4,5,6,7,8-octahydroanthracene as a viscous, colorless liquid with a tenacious musk odor: B.P. 138° C. at 0.3 mm. Hg. CH analysis ($C_{18}H_{26}O$): found C, 83.61, 83.62; H, 10.14, 10.18; calc. C, 83.66; H, 10.14.

By the same procedure, cyclialkylation with 2,5-dichloro-2,3,4,5-teramethylhexane gave the homologue 2-oxa - 5,5,6,7,8,8 - hexamethyl - 1,2,3,4,5,6,7,8-octahydroanthracene as a moderately strong musk.

EXAMPLE 10

*2-oxa-5,5,8,8,10-pentamethyl-1,2,3,4,5,6,7,8-octahydroanthracene (XI)*

Toluene was converted into methylphenyl-ethanol by reaction with ethylene oxide under the influence of aluminum chloride at 8° to 10° C. followed by condensation with formaldehyde. There was obtained a mixture of mainly 5-methyl- and 7-methylisochroman with B.P. 88° to 92° C. at 3 mm. Hg and $n_D^{20}$ 1.5292 to 1.5345. Cyclialkylation of this mixture with 2,5-dichloro-2,5-dimethylhexane afforded the mixture of the corresponding tricyclic isochromans with a moderately strong musk odor.

EXAMPLE 11

*6-oxa-1,1,3,3-tetramethyl-2,3,5,6,7,8-hexahydro-1H-benz[f]-indene (IX)*

(a) Tetramethylindan was prepared according to the method described in the text, by a Grignard reaction of 2-methyl-2-phenyl-pentanone-4 with a methyl magnesium bromide, followed by cyclization of the resulting alcohol with concentrated sulphuric acid.

The hydrocarbon is obtained in an overall yield of 86.8% as a colorless liquid with B.P. 65° C. at 5 mm. Hg: $n_D^{20}$ 1.5022; $d_4^{20}$ 0.8982; M.P. 19° to 20° C.

(b) A suspension of 178 g. (1.33 moles) of aluminum chloride in 870 g. (5 moles) of 1,1,3,3-tetramethylindan and 265 ml. of petroleum ether, B.P. 65° to 68° C., was cooled to 0° C., and at this temperature there was added in the course of 4 hours a solution of 66 g. (1.5 moles) of ethylene oxide in 472 g. (2.7 moles) of 1,1,3,3-tetramethylindan and 137 ml. of petroleum ether, B.P. 65° to 68° C. The reaction mixture was stirred for another hour at 5° to 10° C., and thereupon poured onto a mixture of 1000 g. of ice and 200 ml. of concentrated HCl. The oil layer was separated and the water layer was saturated with salt and extracted twice with 250 ml. of benzene. The oil layer and the benzene extract were combined, solvents were distilled off, and the residue, 1338 g., was distilled in a nitrogen atmosphere, yielding:

(1) 927 g. of distillate, B.P. 50° to 88° C. at 14 mm. Hg,
(2) 375 g. of distillate, B.P. 88° to 170° C. at 3 mm. Hg,
21 g. of residue Upon fractionation of the second fraction of the distillate there was obtained 267.5 g. of recovered tetramethylindan, and
111.0 g. of nearly pure 5-hydroxyethyl-1,1,3,3-tetramethylindan, B.P. 135° to 136° C. at 3 mm. Hg Crystallization from ethanol afforded the pure alcohol, M.P. 47.9° to 48.8° C. CH analysis ($C_{15}H_{22}O$): found C, 82.69, 82.66; H, 10.17, 10.24; calc. C, 82.51; H, 10.16.

(c) 65 g. (0.3 mole) of 5-hydroxyethyl-1,1,3,3-tetramethylindan was converted into the corresponding isochroman by reaction with 0.4 mole of paraformaldehyde and hydrochloric acid, according to A. Rieche and E. Schmitz, loc. cit. The crude product was distilled in a nitrogen atmosphere, giving 61 g. of distillate, B.P. 137° to 190° C. at 3 mm. Hg, and 6 g. of residue. The distillate crystallized slowly upon standing and was recrystallized from ethanol, giving 55 g. of the pure title compound, as white crystals, M.P. 66.2° to 66.7° C. with a fine musk odor. CH analysis ($C_{16}H_{22}O$): found C, 83.55, 83.55; H, 9.60, 9.58; calc. C, 83.43; H, 9.63.

The structure was confirmed by mass spectrometry, N.M.R. and I.R. Gas chromatography demonstrated that the product was pure. The I.R. spectrum is given in FIGURE 6 of the accompanying drawings.

EXAMPLE 12

*6-oxa-1,1,3,3,8-pentamethyl-2,3,5,6,7,8-hexahydro-1H-benz[f]-indene (VII)*

Cyclialkylation of 4-methylisochroman with 2,4-dichloro-2,4-dimethylpentane was carried out according to the method described in Example 1 with 148 g. (1 mole) of 4-methylisochroman,
169 g. (1 mole) of 2,4-dichloro-2,4-dimethylpentane,
333 g. (2.5 moles) of $AlCl_3$ in dry $CCl_4$ at a temperature of —5° to —10° C. The crude product, 235 g., was distilled at 6 mm. under nitrogen, yielding 194 g. of distillate, B.P. 60° to 210° C., and 37 g. of residue. Upon fractionation of the distillate through a Vigreux-type column of 17 theoretical plates, at 0.15 mm. under nitrogen, the desired product was obtained as a colorless, viscous liquid, B.P. 88° at 0.15 mm. and $n_D^{20}$ 1.5272, which slowly crystallized upon standing.

Recrystallization from ethanol afforded the pure compound, determined by gas chromatography, white crystals with very strong and tenacious musk odor: M.P. 57.7 to 58.3° C. CH analysis ($C_{17}H_{24}O$): found C, 83.61, 83.71; H, 9.92, 9.82; calc. C, 83.55; H, 9.90. The structure was confirmed by mass spectrometry, N.M.R. and I.R.

The I.R. spectrum is given in FIGURE 7, the N.M.R. spectrum in FIGURE 8 of the accompanying drawings.

EXAMPLE 13

*6-oxa-1,1,3,3,8,8-hexamethyl-2,3,5,6,7,8-hexahydro-1H-benz[f]-indene (XIV)*

(a) 1 - chloro - 2 - methyl-2-[1′,1′,3′,3′-tetramethylindanyl-5′]-propane was prepared by alkylation of 1,1,3,3-tetramethylindan with an equimolecular amount of methallyl chloride in the presence of sulphuric acid at 10° to 15° C. in a yield of 80% as a colorless liquid with B.P. 123° to 125° C. at 3 mm. Hg, $n_D^{20}$ 1.5181.

(b) 641 grams (2.42) moles of the above mentioned chloride was converted into its Grignard complex by reaction with 65 g. (2.66 g. at.) of magnesium in dry ether. The Grignard complex was oxidized by bubbling a stream of $CO_2$-free oxygen through the ether solution during 3 hours. The temperature during this operation was maintained at 5° to 10° C. by cooling with an ice-salt mixture. The reaction mixture was decomposed with 30% acetic acid. The oil layer was separated and worked up by evaporation of solvent and recrystallization of the residue from an equal volume of petroleum ether, B.P. 60° to 90° C. 2-methyl-2-[1′,1′,3′,3′-tetramethylindanyl-5′]-propanol-1 was obtained in a yield of 437 g., i.e. 73% of theory.

(c) According to the method described by A. Rieche and E. Schmitz loc. cit., the substituted phenylethanol prepared according to (b) was converted into the corresponding isochroman with paraformaldehyde and hydrochloric acid.

The title compound was obtained as a white crystalline product with a weak musk odor. CH analysis ($C_{18}H_{26}O$): found C, 83.64, 83.60; H, 10.30, 10.29; calc. C, 83.67; H, 10.15.

EXAMPLE 14

*6-oxa-1,1,3,3,8,8-hexamethyl-2,3,5,6,7,8-hexahydro-1H-benz[f]-indene (XIV)*

A suspension of 133.5 g. of aluminum chloride in 400 ml. transdichloroethylene was cooled to —5° C. In the course of 30 minutes there was added 81 grams of 4,4-dimethylisochroman while maintaining the temperature at 0° to —5° C.

After this a solution of 84.5 grams of 2,4-dichloro-2,4-dimethylpentane in 200 ml. of trans-dichloroethylene was introduced in the course of 30 minutes. During the addition the temperature was maintained at —5° to —10° C. by using an ice-salt bath. After an additional stirring period of ½ hour at —5° C. the reaction product was poured onto a mixture of 1 kg. of ice and 60 ml. of concentrated HCl. The oil layer was separated and washed with 100 ml. of 2 N HCl, 100 ml. of water, 100 ml. of 25% KOH solution and water till neutral reaction. The solvent was distilled off and the crude product, 130 g., was distilled at 5 mm. in a nitrogen atmosphere.

112 g. of distillate, B.P. 80° to 210° C., and 14.5 g. of residue were obtained.

Fractionation of the distillate through a 12-plate Vigreux column yielded a colorless viscous liquid with musk odor. Crystallization from ethanol yielded pure, by gas chromatography, crystalline musk with M.P. 99.8° to 100.4° C. CH analysis ($C_{18}H_{26}O$): found C, 83.83, 83.84; H, 10.08, 10.11; calc. C, 83.66; H, 10.14.

The structure was confirmed by mass spectrometry, N.M.R. and I.R. The N.M.R. spectrum is given in FIGURE 9 of the accompanying drawings.

EXAMPLE 15

*6-oxa-1,1,2,3,3,8-hexamethyl-2,3,5,6,7,8-hexahydro-1H-benz[f]-indene (V)*

(a) *1,1,2,3,3-pentamethyl-indan.*—A mixture of 410 pounds of α-methylstyrene and 290 pounds of tertiary amyl alcohol was added over a six hour period, to a well stirred solution of 350 pounds of glacial acetic and 350 pounds of concentrated (93%) sulphuric acid, maintained at 25° C. After completion of the addition, the mixture was stirred at 25° C. for four hours more. The mass was then poured into 140 gallons of water maintained at 0°–10° C. and the oil which separated was washed with (a) 35 gallons of water, (b) twice with 35 gallons of 5% aqueous sodium hydroxide, and (c) two times with 35 gallons of water. The oil was distilled, yielding 270 pounds of the title compound; B.P. 85° C./3.1 mm. Hg; $n_D^{20}$ 1.5090. After careful fractionation the physical constants of 1,1,2,3,3-pentamethylindan were found to be $n_D^{20}$ 1.5111, $d_4^{20}$ 0.9158.

(b) *2-(1',1',2',3',3'-pentamethyl-indanyl-5')-propanol-1*.—To a well stirred mixture of 1504 g. (8 moles) of 1,1,2,3,3-pentamethyl-indan and 1066 g. (8 moles) of anhydrous aluminum chloride powder, maintained at −10° to −5° C., there was added over a nine hour period, a solution of 465 g. (8 moles) of propylene oxide in 13,335 g. (72 moles) of 1,1,2,3,3-pentamethylindan. The propylene oxide-hydrocarbon solution was added below the surface of the aluminum chloride-hydrocarbon slurry. When the addition was complete, the reaction mass was immediately added to an equal volume of well stirred ice water. The organic upper layer was separated, washed with one-third volume of 5% sodium hydroxide solution and then three times with equal volumes of saturated sodium chloride solution. The unreacted pentamethylindan, 13,290 g., was removed by vacuum distillation until a distillation pot temperature of 98° C./3 mm. of Hg was obtained. The residual oil, 1338 g., was distilled and 1162 g. of a viscous oil, which crystallized on standing, was obtained; B.P. 120° to 123° C. at 0.2 mm. M.P. 53° to 53.5° C. The compound was identified by its N.M.R. spectrum, which is given in FIGURE 10 of the accompanying drawings.

(c) *6-oxa-1,1,2,3,3,8-hexamethyl-2,3,5,6,7,8-hexahydro-1H-benz[f]-indene*.—To 3656 g. of the alcohol obtained as under (b) which has been heated above its melting point there was added enough HCl gas to saturate the solution. Upon saturation, the mixture was cooled, while stirring, to 25° C. and approximately 500 g. of anhydrous hydrogen chloride passed into the reaction mass, and simultaneously 512 g. of paraformaldehyde was added. These additions took a total of 6 hours. In this manner, the chloromethyl ether of the alcohol is formed, as evidenced by its N.M.R. spectrum. It can be used without purification for the next step. The crude chloromethyl ether, approximately 4200 g., was heated at 120° C. for 2 hours. The reaction mass was cooled to 80° C. and an equal volume of 16% aqueous sodium hydroxide was added. The mixture was stirred for two hours at 80° C. On cooling, the mass was poured into water, washed neutral, and the oil distilled; 3806 g. of a viscous material, B.P. 129° C. at 0.8 mm., was collected.

The product obtained has a strong musk odor, $n_D^{20}$ 1.5342; $d_4^{20}$ 1.0054.

The I.R. spectrum is given in FIGURE 11 and the N.M.R. spectrum in FIGURE 12 of the accompanying drawings.

EXAMPLE 16

*6-oxa-1,1,2,3,3-pentamethyl-2,3,5,6,7,8-hexahydro-1H-benz[f]-indene (VI)*

(a) *2-(1',1',2',3',3'-pentamethylindanyl-5')-ethanol*.—To a well stirred mixture of 1504 g. (8 moles) of 1,1,2,3,3-pentamethylindan and 1066 g. (8 moles) of aluminum chloride maintained at −10° to −5° C., there was added, over a nine-hour period, a solution of 352 g. (8 moles) of ethylene oxide dissolved in 13,336 g. (72 moles) of 1,1,2,3,3-pentamethylindan; the ethylene oxide-hydrocarbon solution was added below the surface of the aluminum chloride-hydrocarbon slurry. Upon completion of addition, the reaction mass was worked up according to Example 15. The unreacted pentamethylindan, 13,580 g. was removed by vacuum distillation until a distillation pot temperature of 150° C. at 3 mm. was obtained. The residual oil, 1134 g., was carefully fractionated and 910 g. of a constant boiling viscous liquid, B.P. 121° C. at 0.7 mm., was obtained, $n_D^{20}$ 1.5279, $d_4^{20}$ 1.0388. The structure of this compound is confirmed by the N.M.R. spectrum which is given in FIGURE 13 of the accompanying drawings.

(b) *6-oxa-1,1,2,3,3 - pentamethyl - 2,3,5,6,7,8 - hexahydro-1H-benz[f]-indene*.—650 g. of anhydrous hydrogen chloride gas was added to a well stirred slurry of 910 g. of the alcohol obtained as under a, and 127 g. of paraformaldehyde, maintained at 16° C. The gas was introduced below the surface of the liquid. On completion of the HCl addition, the reaction mass became completely liquid, an indication of reaction completion. The structure of the chloromethyl ether was confirmed by the N.M.R. spectrum. 900 g. of the crude chloromethyl ether were heated at 120° C. for 2 hours. The reaction mass was then worked up according to Example 15. Distillation of the oil, 825 g. yields a clear viscous liquid, B.P. 148° to 150° C. at 1 mm., with a strong musk odor, $n_D^{20}$ 1.5390; $d_4^{20}$ 0.9882. The I.R. spectrum is given in FIGURE 14 and the N.M.R. spectrum in FIGURE 15 of the accompanying drawings. The oil crystallizes on standing and can be recrystallized from ethanol. Melting point 53.4° to 54.3° C.

EXAMPLE 17

*6-oxa-1,1,2,3,3,8-hexamethyl-2,3,5,6,7,8-hexahydro-1H-benz[f]-indene (V)*

(a) *1,1,2,3,3-pentamethylindan*.—Crude 3,4 - dimethyl-4-chloropentanone-2 was synthesized according to the procedure described by J. Colonge, Bull. 5, 339 (1939), by a Kondakov acetylation of trimethylethylene with acetyl chloride in the presence of $SnCl_4$. A suspension of 106.8 g. (0.8 mole) of aluminum chloride in 312 g. of dry benzene was cooled to 10° C. and in the course of 1 hour there was added with vigorous stirring a solution of 165 g. (1.1 moles) of 3,4-dimethyl-4-chloropentanone-2 in 78 g. of dry benzene, while the temperature was maintained at 10° C. by cooling in an ice bath. The mixture was stirred for another two hours while the temperature was allowed to rise to 20° C.

The reaction mixture was poured onto a mixture of 1 kg. of ice, and
80 ml. of concentrated HCl The oil layer was separated and worked up by washing with an equal volume of 5% HCl, 10% NaOH and water. The solvent was distilled off. Upon distillation of the crude product there were obtained: 133 g. of distillate, B.P. 60–150° C. at 3 mm., and 40 g. of residue.

Fractionation of the distillate through an 8-plate Vigreux column yielded 2,3-dimethyl-2-phenylpentanone-4 with B.P. 95° C. at 3 mm.; $n_D^{20}$ 1.5120. The structure was proved by I.R. and N.M.R.

To a solution of 0.2 mole of methyl magnesium bromide in ether, was added in the course of ½ hour at a temperature of 5° to 10° C., 38 g. (0.2 mole) of 2,3-dimethyl-2-phenylpentanone-4.

The mixture was stirred for another 3 hours, while the temperature was allowed to rise to 20° C. The reaction mixture was decomposed with dilute sulphuric acid and worked up according to standard procedure.

Flash distillation of the crude product afforded 37 g. of distillate, B.P. 110°–115° C. at 3 mm., and 2 g. of residue.

The distillate, practically pure 2-phenyl-2,3,4-trimethylpentanol-4, was cyclized by adding it in the course of ½ hour to 50 ml. of 85% sulphuric acid.

The mixture was stirred for another 1½ hours, while the temperature was maintained at 10° C.

The reaction mixture was diluted with a mixture of 50 ml. of benzene and 50 ml. of ice cold water.

The oil layer was separated and washed with 5% $NaHCO_3$ and water. The solvent was distilled off and the crude product was separated from the residue by distillation. There were obtained 28 g. of distillate, B.P. 78° to 100° C. at 3 mm. Hg, and 6 g. of residue. Fractionation of the distillate through a 14-plate Vigreux column afforded 1,1,2,3,3-pentamethylindan as a colorless liquid with B.P. 73° C. at 3 mm.; $n_D^{20}$ 1.5114, $d_4^{20}$ 0.9169.

(b) *6-oxa-1,1,2,3,3,8-hexamethyl - 2,3,5,6,7,8 - hexahydro-1H-benz[f]-indene*.—Pentamethylindan was converted into the corresponding isochroman according to the method described in Example 15(b). The product obtained was identical with that of Example 15.

EXAMPLE 18

Compound VIII incorporated in a perfume composition:

| | Parts by wt. |
|---|---|
| 2-oxa-5,5,8,8 - tetramethyl - 1,2,3,4,5,6,7,8 - octahydroanthracene | 10 |
| Coumarin | 2 |
| Lavender oil | 18 |
| Citronellyl acetate | 3 |
| Bois de Rose oil | 7 |
| Phenylethyl alcohol | 12 |
| α-Amyl cinnamic aldehyde | 15 |
| Benzyl acetate | 13 |
| Terpineol | 15 |
| Cinnamic alcohol | 5 |
| | 100 |

EXAMPLE 19

Compound IV incorporated in a soap perfume:

| | Parts by wt. |
|---|---|
| 2 - oxa - 4,5,5,8,8-pentamethyl - 1,2,3,4,5,6,7,8-octahydroanthracene | 9 |
| Cinnamyl acetate | 1 |
| Phenylethyl acetate | 1.5 |
| Benzyl acetate | 11 |
| Bois de Rose oil | 15 |
| Amyl salicylate | 7 |
| Phenylethyl alcohol | 12.5 |
| Terpineol | 7.5 |
| Cinnamic alcohol | 3 |
| Guaiyl acetate | 2 |
| Cedarwood oil | 8 |
| Geraniol | 10 |
| Eugenol | 2.5 |
| Lavendin | 10 |
| | 100.0 |

EXAMPLE 20

Compound V incorporated in a perfume:

| | Parts by wt. |
|---|---|
| 6-oxa-1,1,2,3,3,8-hexamethyl-2,3,5,6,7,8-hexahydro-1H-benz[f]-indene | 2.5 |
| Coumarin | 3 |
| Bergamot oil | 4 |
| Geraniol | 15 |
| Citronellol | 15 |
| Phenylethyl alcohol | 12 |
| Geranium oil Bourbon | 3 |
| Patchouli oil | 1 |
| Benzoin | 2 |
| Styrax | 2 |
| Oak moss | 1 |
| Terpineol | 3 |
| Amyl cinnamic aldehyde | 8 |
| Benzyl acetate | 10 |
| Methyl ionone, 100% | 6.5 |
| Sandalwood oil East Indian | 2 |
| Amyl salicylate | 5 |
| Lavendin oil | 5 |
| | 100.0 |

In the accompanying drawings forming part of this application the figures represent charts referred to in the above examples, and are listed as follows:

FIGURE 1 is a gas chromatogram (G.C.) of Compound VIII of Example 1.

FIGURE 2 is a G.C. of Compound XIII of Example 8.

FIGURE 3 is an infrared spectrum (I.R.) of Compound VIII of Example 1.

FIGURE 4 is an I.R. of Compound IV of Example 6.

FIGURE 5 is a nuclear magnetic resonance spectrogram (N.M.R.) of Compound IV of Example 6.

FIGURE 6 is an I.R. of Compound IX of Example 11.

FIGURE 7 is an I.R. of Compound VII of Example 12.

FIGURE 8 is an N.M.R. of Compound VII of Example 12.

FIGURE 9 is an N.M.R. of an intermediate of Compound XIV of Example 14.

FIGURE 10 is an N.M.R. of an intermediate of Compound V of Example 15.

FIGURE 11 is an I.R. of Compound V of Example 15.

FIGURE 12 is an N.M.R. of Compound V of Example 15.

FIGURE 13 is an N.M.R. of an intermediate of Compound VI of Example 16.

FIGURE 14 is an I.R. of Compound VI of Example 16, and

FIGURE 15 is an N.M.R. of Compound VI of Example 16.

What we claim is:

1. A new tricyclic isochroman with musk odor having the structure (I):

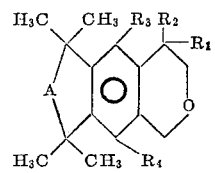

in which substituents $R_1$ and $R_2$ are selected from the group consisting of methyl and hydrogen, and where substituents $R_3$ and $R_4$ are selected from the group consisting of methyl and hydrogen, and where one of said substituents $R_3$ and $R_4$ is methyl, the other is hydrogen; and A is selected from the group consisting of methylene, ethylene, ethylidene, 1,2-propylene and 2,3-butylene.

2. A new tricyclic isochroman with musk odor having the structure (V):

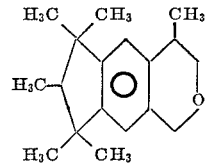

which is 6-oxa-1,1,2,3,3,8-hexamethyl-2,3,5,6,7,8-hexahydro-1H-benz[f]-indene.

3. A new tricyclic isochroman with musk odor having the structure (VI):

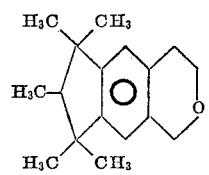

which is 6-oxa-1,1,2,3,3-pentamethyl-2,3,5,6,7,8-hexahydro-1H-benz[f]-indene.

4. A new tricyclic isochroman with musk odor having the structure (IV):

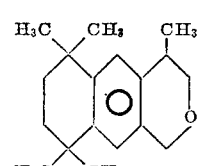

which is 2-oxa-4,5,5,8,8-pentamethyl-1,2,3,4,5,6,7,8-octahydroanthracene.

5. A new tricyclic isochroman with musk odor having the structure (VIII):

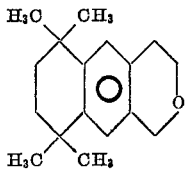

which is 2-oxa-5,5,8,8-tetramethyl-1,2,3,4,5,6,7,8-octahydroanthracene.

References Cited

UNITED STATES PATENTS

| | | | |
|---|---|---|---|
| 2,682,473 | 6/1954 | Thompson et al. | 167—94 |
| 2,905,591 | 9/1959 | Bulloff | 167—94 |
| 2,918,412 | 12/1959 | Wood | 167—94 |
| 2,987,525 | 6/1961 | Arrigo | 260—345.2 |
| 3,041,354 | 6/1962 | Olin | 260—345.2 |

OTHER REFERENCES

Adams et al. (Ed.): "Organic Reactions," vol. III, Wiley & Sons, New York, 1946, page 12.

Theilheimer: "Synthetic Methods of Organic Chemistry," vol. 7, Interscience Pub., Inc., New York (1953), page 309, entry 803.

WALTER A. MODANCE, *Primary Examiner.*

N. RIZZO, *Examiner.*

N. H. STEPNO, J. M. FORD, *Assistant Examiners.*

UNITED STATES PATENT OFFICE
CERTIFICATE OF CORRECTION

Patent No. 3,360,530                              December 26, 1967

Lambertus Gerke Heeringa et al.

It is hereby certified that error appears in the above numbered patent requiring correction and that the said Letters Patent should read as corrected below.

Column 1, lines 45 to 54, formula II should appear as shown below instead of as in the patent:

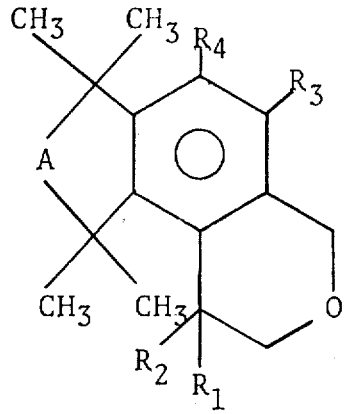

column 2, line 7, for "to" read -- of --; lines 17 to 23, for that portion of formula VI reading "C$_3$C" read -- H$_3$C --; lines 26 to 32, for that portion of formula VIII reading "H$_3$O" read -- H$_3$C --; column 3, lines 6 to 11, formula XX should appear as shown below instead of as in the patent:

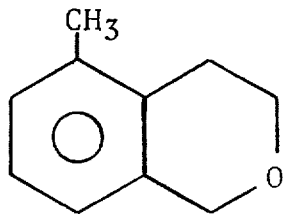

column 4, lines 13 to 19, formulas XXV and XXVI should appear as shown below instead of as in the patent:

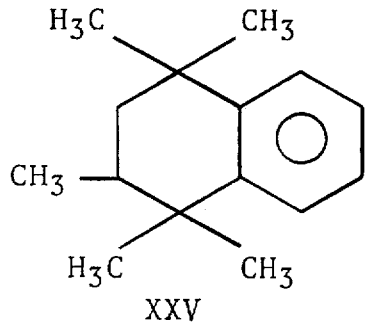
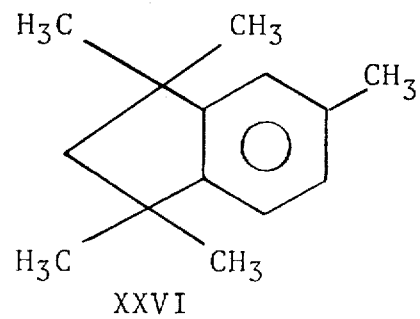

same column 4, lines 32 to 39, the left-hand portion of the equation should appear as shown below instead of as in the patent:

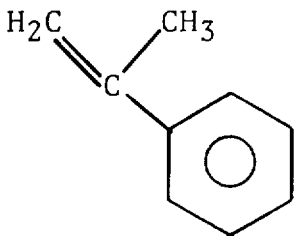

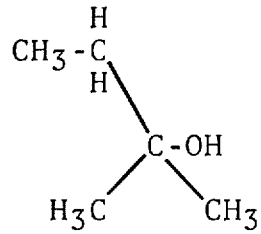

column 5, lines 14 to 20, the right-hand portion of the equation should appear as shown below instead of as in the patent:

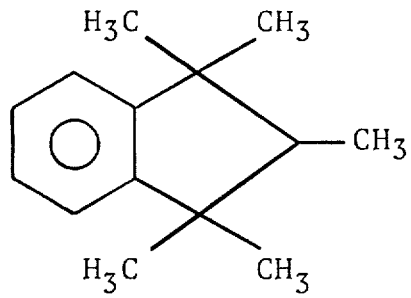

column 7, line 25, after "dichloroethane" insert a period; column 11, line 12, after "Hg" insert a period; line 57, for "57.7" read -- 57.7° --.

Signed and sealed this 25th day of February 1969.

(SEAL)
Attest:

EDWARD M. FLETCHER, JR.
Attesting Officer

EDWARD J. BRENNER
Commissioner of Patents